US009701769B2

(12) United States Patent
Forgue et al.

(10) Patent No.: US 9,701,769 B2
(45) **Date of Patent: *Jul. 11, 2017**

(54) PROPYLENE POLYMER WITH IMPROVED PROCESSABILITY IN THERMOFORMING

(71) Applicant: TOTAL RESEARCH & TECHNOLOGY FELUY, Seneffe (BE)

(72) Inventors: Thomas Forgue, Belberaud (FR); Jerome Gromada, Waterloo (BE); Alain Standaert, Brussels (BE); Rita De Luca, Souvret (BE)

(73) Assignee: Total Research & Technology Feluy, Seneffe (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/858,846

(22) Filed: Sep. 18, 2015

(65) Prior Publication Data

US 2016/0009837 A1 Jan. 14, 2016

Related U.S. Application Data

(62) Division of application No. 13/395,751, filed as application No. PCT/EP2010/064556 on Sep. 30, 2010, now Pat. No. 9,187,586.

(30) Foreign Application Priority Data

Oct. 1, 2009 (EP) .................................... 09171954

(51) Int. Cl.

| | |
|---|---|
| ***B29C 51/02*** | (2006.01) |
| ***C08F 210/06*** | (2006.01) |
| ***C08L 23/14*** | (2006.01) |
| ***C08F 297/08*** | (2006.01) |
| ***C08L 23/16*** | (2006.01) |
| ***B29C 51/00*** | (2006.01) |
| ***C08F 10/06*** | (2006.01) |
| *B29K 23/00* | (2006.01) |
| *C08F 110/06* | (2006.01) |

(52) U.S. Cl.

CPC .......... *C08F 210/06* (2013.01); *B29C 51/002* (2013.01); *B29C 51/02* (2013.01); *C08F 10/06* (2013.01); *C08F 297/083* (2013.01); *C08L 23/14* (2013.01); *C08L 23/16* (2013.01); *B29K 2023/14* (2013.01); *C08F 110/06* (2013.01); *C08F 2410/04* (2013.01); *C08L 2205/025* (2013.01)

(58) Field of Classification Search

CPC .. C08F 210/06; C08F 210/16; C08F 297/083; C08F 2410/04; C08F 2/001; C08L 23/14; C08L 23/16; C08L 2205/025; B29C 51/002; B29C 51/02; B29K 2023/14

USPC ....... 525/240, 242, 247, 249; 526/65, 124.3; 264/331.17

See application file for complete search history.

(56) References Cited

U.S. PATENT DOCUMENTS

| | | | | |
|---|---|---|---|---|
| 5,506,307 A * | 4/1996 | Memon | C08L 23/10 | 525/227 |
| 9,187,586 B2 * | 11/2015 | Forgue | C08F 10/06 | |
| 2005/0187349 A1 * | 8/2005 | Kim | C08F 210/06 | 525/191 |
| 2006/0182987 A1 * | 8/2006 | Yu | C08F 10/00 | 428/523 |
| 2007/0036909 A1 * | 2/2007 | Luo | B05D 7/04 | 427/532 |
| 2007/0100056 A1 * | 5/2007 | Uosaki | C08J 3/005 | 524/487 |
| 2008/0015316 A1 * | 1/2008 | Lin | C08F 10/00 | 526/65 |
| 2009/0156760 A1 * | 6/2009 | Patkar | B29C 47/0021 | 526/90 |

* cited by examiner

*Primary Examiner* — Roberto Rabago
(74) *Attorney, Agent, or Firm* — Albert Shung

(57) ABSTRACT

Propylene polymer including at least two propylene polymer fractions of different melt flow index and a minor amount of at least one comonomer may be characterized by specific ranges for melt flow index, xylene solubles content and recovery compliance. The propylene polymer may be particularly suited for thermoforming.

13 Claims, No Drawings

PROPYLENE POLYMER WITH IMPROVED PROCESSABILITY IN THERMOFORMING

CROSS-REFERENCE TO RELATED APPLICATIONS

This application is a Divisional of U.S. patent application Ser. No. 13/395,751, filed on May 18, 2012, now U.S. Pat. No. 9,187,586, which is a National Stage Entry of PCT/EP2010/064556, filed on Sep. 30, 2010, which claims priority from EP 09171954.2, filed on Oct. 1, 2009, the entireties of which are incorporated herein by reference.

FIELD OF THE INVENTION

The present invention concerns a propylene polymer comprising at least two propylene polymer fractions of different melt flow index and a minor amount of at least one comonomer, said propylene polymer being further characterized by specific ranges for melt flow index, xylene solubles content and recovery compliance. Said propylene polymer is particularly suited for thermoforming. The present invention further concerns a process for producing said propylene polymer as well as its use in thermoforming.

THE TECHNICAL PROBLEM AND THE PRIOR ART

In thermoforming, a soft polymer sheet is draped over or into a form or mold. In its basic form a thermoforming process comprises the steps of (i) warming the sheet to a temperature at which it is soft, (ii) draping the soft sheet over or into a mold, thus obtaining a formed sheet, (iii) cooling the formed sheet to a temperature at which it can maintain its shape, and (iv) removing the formed sheet from the mold.

In contrast to other forming processes, such as for example injection molding or blow molding, thermoforming is a low-pressure and low-temperature process.

Generally the polymer sheet serving as feedstock for the thermoforming process is produced by melt-extrusion. Thus, one often speaks of "extrusion-thermoforming" to denote the complete process with the two distinct processing stages of (i) the production of a sheet by melt-extrusion of a polymer, and (ii) the thermoforming stage, wherein the sheet is formed or shaped.

Extrusion-thermoforming comes in numerous variations. It may for example be done either in-line, i.e. the sheet is directly fed from the sheet-extrusion step to the thermoforming step, or off-line, i.e. the sheet is stored before being fed to the thermoforming step.

The polymers used in thermoforming are in most cases thermoplastic polymers, which may be distinguished into amorphous and crystalline or semi-crystalline polymers. Amorphous polymers are characterized in that they become progressively softer as temperature increases. Examples of such polymers are polystyrene and polycarbonate. Semi-crystalline or crystalline polymers by contrast are characterized by melting at a specific temperature, around which within a few degrees they become too fluid for thermoforming. Examples are polypropylene and polyethylene.

Historically, amorphous polymers are preferred in thermoforming because they have a broader processing window than (semi-)crystalline polymers. Polystyrene, for example, can be thermoformed at a temperature between 127° C. and 180° C., i.e. it has a processing window of more than 50° C. By contrast, polypropylene becomes too fluid above its melting temperature and hence generally is thermoformed at a temperature, which must be below the melting point but sufficiently high to be thermoformable. Polypropylene's processing window therefore is only about 3° C. (see J. L. Throne, Understanding Thermoforming, Carl Hanser Verlag, Munich, 1999, page 12).

Polypropylene, however, is of great interest because it offers good mechanical and chemical properties in combination with good economics. Thermoforming companies as well as polymer producers have therefore undertaken major research and development efforts to render polypropylene more suitable for use in thermoforming. So far, however, all efforts to broaden the processing window of polypropylene in thermoforming have been unsuccessful.

There still remains a need in the industry for polypropylenes with improved processability in thermoforming, preferably without sacrificing other properties, such as for example processability in the melt-extrusion step or mechanical properties of the final thermoformed articles.

It is therefore an object of the present invention to provide a propylene polymer that is suited for thermoforming.

It is also an object of the present invention to provide a propylene polymer with improved processability in thermoforming.

It is a further object of the present invention to provide a propylene polymer with good optical properties.

Furthermore, it is an object of the present invention to provide a propylene polymer with good mechanical properties.

In addition, it is an object of the present invention to provide a propylene polymer having good mechanical and optical properties in combination with good processability, particularly processability in thermoforming.

BRIEF DESCRIPTION OF THE INVENTION

We have now discovered that any of these objectives, either by itself of in any combination, can be met by providing a propylene polymer comprising at least two propylene polymer fractions of different melt flow index and a minor amount of at least one comonomer, said propylene polymer being further characterized by specific ranges for melt flow index, xylene solubles content and recovery compliance.

Thus, the present invention provides a propylene polymer comprising at least one comonomer and at least two propylene polymer fractions of different melt flow index, said propylene polymer being characterized by a melt flow index in the range from 0.5 dg/min to 8.0 dg/min, determined according to ISO 1133, condition L at 230° C. and 2.16 kg, a xylene solubles content in the range from 1.0 wt % to 4.0 wt %, relative to the total weight of the propylene polymer, and a recovery compliance of at least $6.0 \cdot 10^{-4}$ $Pa^{-1}$ and of at most $7.5 \cdot 10^{-4}$ $Pa^{-1}$, a total comonomer content of from 0.1 wt % to 1.0 wt %, relative to the total weight of the propylene polymer, wherein the fraction with the lowest melt flow index has a melt flow index in the range from 0.2 dg/min to 1.0 dg/min, determined according to ISO 1133, condition L at 230° C. and 2.16 kg.

The present invention also provides a process for the production of the propylene polymer of the present invention in presence of (i) at least two Ziegler-Natta polymerization catalysts having different internal donors, each Ziegler-Natta polymerization catalyst having a different hydrogen response, each of said Ziegler-Natta catalysts comprising a titanium compound, which has at least one titanium-halogen bond, and an internal donor, both supported on magnesium halide in active form,
(ii) an organoaluminum compound (Al),
(iii) an external electron donor (ED), and
(iv) hydrogen, said process comprising the step of polymerizing propylene and at least one comonomer in a single polymerization reactor, so as to produce the propylene polymer of the present invention.

The present invention also provides a process for the production of the propylene polymer of the present invention in at least two sequential polymerization reactors in presence of (i) a Ziegier-Natta polymerization catalyst, said Ziegler-Natta catalyst comprising a titanium compound, which has at least one titanium-halogen bond, and an internal donor, both supported on magnesium halide in active form,
(ii) an organoaluminum compound (Al),
(iii) an external electron donor (ED), and
(iv) hydrogen, said process comprising the steps of (a) polymerizing propylene or polymerizing propylene and at least one comonomer in a first polymerization reactor to produce a first propylene polymer fraction;
(b) transferring said first propylene polymer fraction to a second polymerization reactor; and
(c) polymerizing propylene or polymerizing propylene and at least one comonomer in said second polymerization reactor to produce a second propylene polymer fraction,
(f) recovering said propylene polymer after the last of the polymerization reactors.

wherein the hydrogen concentration in at least one of the sequential polymerization reactors is different from the hydrogen concentration in the remaining polymerization reactors, and wherein the hydrogen concentration in at least one of the polymerization reactors is controlled such as to produce therein the propylene polymer fraction with the lowest melt flow index as defined above, so as to produce the propylene polymer of claims 1 to 10.

Further, the present invention provides thermoformed articles produced with the propylene polymer of the present invention as well as a process to produce such thermoformed articles.

Additionally, the present invention provides for the use of the propylene polymer of the present invention in thermoforming for broadening the thermoforming window by at least 0.5° C. as compared to a propylene homopolymer with a single propylene homopolymer fraction and a recovery compliance of $5.6\cdot10^{-4}$ $Pa^{-1}$ thermoformed under essentially the same conditions.

DETAILED DESCRIPTION OF THE INVENTION

Throughout the present patent application the melt flow index is determined according to ISO 1133, condition L, at 230° C. and 2.16 kg.

Throughout the present application the terms "polypropylene" and "propylene polymer" may be used synonymously.

Throughout the present application the terms "forming" and "shaping" may be used synonymously.

For the purposes of the present invention "sheet" is defined as having a thickness in the range from 500 μm to 2000 μm.

To be suited for thermoforming the propylene polymer of the present invention has a melt flow index in the range from 0.5 dg/min to 8.0 dg/min. Preferably the melt flow index is in the range from 1.0 dg/min to 5.0 dg/min, more preferably in the range from 1.5 dg/min to 4.5 dg/min, even more preferably in the range from 2.0 dg/min to 4.0 dg/min, and most preferably in the range from 2.5 dg/min to 3.5 dg/min.

The propylene polymer of the present invention is further characterized in that the xylene solubles content is in the range from 1.0 wt % to 4.0 wt %, relative to the total weight of the propylene polymer. Preferably, the xylene solubles content is at least 1.3 wt %, relative to the total weight of the propylene polymer.

Preferably, the xylene solubles content is at most 3.5 wt %, more preferably at most 3.0 wt %, even more preferably at most 2.8 wt %, and most preferably at most 2.5 wt %, relative to the total weight of the propylene polymer. The xylene solubles content of the propylene polymer is determined by dissolving the propylene polymer in refluxing xylene, cooling the solution to 25° C., filtering the solution, and subsequently evaporating the solvent. The residue, which is the xylene soluble fraction of the propylene polymer, is then dried and weighed. A more detailed description of the method to determine the xylene solubles content is given in the examples.

The propylene polymer of the present invention is also characterized in that the recovery compliance is at least $6.0\cdot10^{-4}$ $Pa^{-1}$ and at most $7.5\cdot10^{-4}$ $Pa^{-1}$. Preferably, said recovery compliance is at least $6.2\cdot10^{-4}$ $Pa^{-1}$, more preferably at least $6.4\cdot10^{-4}$ $Pa^{-1}$, even more preferably at least $6.5\cdot10^{-4}$ $Pa^{-1}$, and most preferably at least $6.6\cdot10^{-4}$ $Pa^{-1}$. Preferably said recovery compliance is at most $7.3\cdot10^{-4}$ $Pa^{-1}$, more preferably at most $7.1\cdot10^{-4}$ $Pa^{-1}$, even more preferably at most $6.9\cdot10^{-4}$ $Pa^{-1}$, and most preferably at most $6.8\cdot10^{-4}$ $Pa^{-1}$. The recovery compliance is determined at 230° C. using a parallel-plate rotational stress rheometer. The recovery compliance is defined as the recoverable strain divided by the stress applied during the test. A more detailed description of the test method is given in the examples.

For the propylene polymer of the present invention it is essential that it comprises at least one comonomer and that the total comonomer content of the propylene polymer of the present invention is in the range from 0.1 wt % to 1.0 wt %, relative to the total weight of the propylene polymer. Thus, the propylene polymer of the present invention is a random copolymer of propylene and at least one comonomer. Preferably the total comonomer content is in the range from 0.2 wt % to 0.8 wt %, and most preferably in the range from 0.3 wt % to 0.5 wt %, relative to the total weight of the propylene polymer. The total comonomer content can for example be determined by analytical methods, such as IR- or NMR-analysis as described in more detail in the examples.

While the nature of the comonomer is not so important as long as it can be copolymerized with propylene in presence of propylene polymerization catalysts, it is nevertheless preferred that the comonomer is an alpha-olefin different from propylene. Examples of suitable alpha-olefins are ethylene, butene-1, pentene-1, hexene-1,4-methylene-pentene-1 and octene-1. Of these, ethylene, butene-1 and hexene-1 are preferred. Ethylene is the most preferred comonomer. Thus, the most preferred propylene polymer is a random copolymer of propylene and ethylene.

During the polymerization reaction comonomer(s) can be introduced into the growing polymer chains in blocks, i.e. a large number of comonomer units following each other; or, alternatively, comonomer(s) can be introduced in an essentially statistical distribution, i.e. the number of comonomer units following each other is very limited. In the ideal case for an essentially statistical distribution isolated comonomer units are interspersed between propylene monomer units.

In the propylene polymer of the present invention it is preferred that at least 60 mol %, more preferably at least 70 mol % and most preferably at least 80 mol % of the total amount of comonomer in the propylene polymer is present as single comonomer units in the polymer chains of the propylene polymer. The amount of single comonomer units can be determined by NMR analysis according to the method described by G. J. Ray et al. in Macromolecules, vol. 10, no. 4, 1977, p. 773-778.

It is essential that the propylene polymer of the present invention comprises at least two propylene polymer fractions of different melt flow index, wherein the melt flow index of the propylene polymer fraction with the lowest melt flow index has a melt flow index in the range from 0.2 dg/min to 1.0 dg/min. Preferably said melt flow index of the propylene polymer fraction with the lowest melt flow index is in the range from 0.3 dg/min to 0.9 dg/min, more preferably in the range from 0.4 dg/min to 0.8 dg/min and most preferably in the range from 0.5 dg/min to 0.7 dg/min. Preferably the propylene polymer of the present invention comprises two, three or four propylene polymer fractions of different melt flow index, more preferably it comprises two or three propylene polymer fractions of different melt flow index, and most preferably it comprises two propylene polymer fractions of different melt flow index.

It is preferred that the propylene polymer of the present invention comprises from 50 wt % to 70 wt %, most preferably from 55 wt % to 65 wt %, relative to the total weight of the propylene polymer, of said propylene polymer fraction with the lowest melt flow index.

With respect to the distribution of the comonomer in the propylene polymer fractions of different melt flow index it is nevertheless preferred that either each of the at least two propylene polymer fractions has substantially the same comonomer content, or that the propylene polymer fraction with the lowest melt flow index contains at least 80 wt % of the total comonomer content of the propylene polymer.

In the case that each of the at least two propylene polymer fractions has substantially the same comonomer content, it is more preferred that relative to the comonomer content of the propylene polymer fraction with the lowest melt flow index, the comonomer content of the other propylene polymer fractions is from 70% to 130%, even more preferably from 80% to 120%, still even more preferably from 90% to 110%, and most preferably from 95% to 105%, under the provision that each of the at least two propylene polymer fractions comprises comonomer. For example, if the comonomer content of the propylene polymer fraction with the lowest melt flow index is 0.5 wt %, relative to the total weight of said propylene polymer fraction, then 110% in an other propylene polymer fraction would correspond to a comonomer content of 0.55 wt %, relative to the total weight of that respective other propylene polymer fraction.

In the case that the propylene polymer fraction with the lowest melt flow index contains at least 80 wt % of the total comonomer content of the propylene polymer, it is most preferred that the propylene polymer fraction with the lowest melt flow index contains at least 80 wt % and at most 95 wt % of the total comonomer content of the propylene polymer.

Preferably, the propylene polymer of the present invention is further characterized by a high isotacticity, for which the content of mmmm pentads is a measure. The content of mmmm pentads is preferably in the range from 97.0% to 99.0%. The content of mmmm pentads is determined on the heptane insoluble fraction of the xylene insoluble fraction by NMR analysis according to the method described by G. J. Ray et al. in Macromolecules, vol. 10, no. 4, 1977, p. 773-778.

The propylene polymer of the present invention may contain additives, such as by way of example, antioxidants, light stabilizers, acid scavengers, lubricants, antistatic additives, nucleating/clarifying agents, and colorants. An overview of such additives may be found in Plastics Additives Handbook, ed. H. Zweifel, 5th edition, 2001, Hanser Publishers.

Preferably, the heterophasic propylene copolymers may contain one or more nucleating agents. The nucleating agent used in the present invention can be any of the nucleating agents known to the skilled person. It is, however, preferred that the nucleating agent be selected from the group consisting of talc, carboxylate salts, sorbitol acetals, phosphate ester salts, substituted benzene tricarboxamides and polymeric nucleating agents, as well as blends of these. The most preferred nucleating agents are talc, carboxylate salts, and phosphate ester salts.

The carboxylate salts used as nucleating agents in the present invention can be organocarboxylic acid salts. Particular examples are sodium benzoate and lithium benzoate. The organocarboxylic acid salts may also be alicyclic organocarboxylic acid salts, preferably bicyclic organodicarboxylic acid salts and more preferably a bicyclo[2.2.1] heptane dicarboxylic acid salt or a cyclohexanedicarboxylic acid salt. Nucleating agents of this type are sold as HYPERFORM® HPN-68 resp. HYPERFORM® HPN-20E by Milliken Chemical.

Examples for sorbitol acetals are dibenzylidene sorbitol (DBS), bis(p-methyl-dibenzylidene sorbitol) (MDBS), bis (p-ethyl-dibenzylidene sorbitol), bis(3,4-dimethyl-dibenzylidene sorbitol) (DMDBS), and bis(4-propylbenzylidene) propyl sorbitol. Bis(3,4-dimethyl-dibenzylidene sorbitol) (DMDBS) is preferred. These sorbitols can for example be obtained from Milliken Chemical under the trade names of Millad 3905, Millad 3940, Millad 3988, and Millad NX 8000.

Examples of phosphate ester salts are salts of 2,2'-methylene-bis-(4,6-di-tert-butylphenyl)phosphate. Such phosphate ester salts are for example available as NA-11 or NA-21 from Asahi Denka.

Examples of substituted tricarboxamides are those of general formula

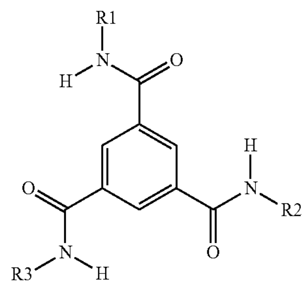

wherein R1, R2 and R3, independently of one another, are selected from $C_1$-$C_{20}$ alkyls, $C_5$-$C_{12}$ cycloalkyls, or phenyl, each of which may in turn by substituted with $C_1$-$C_{20}$ alkyls, $C_5$-$C_{12}$ cycloalkyls, phenyl, hydroxyl, $C_1$-$C_{20}$ alkylamino or $C_1$-$C_{20}$ alkyloxy etc. Examples for $C_1$-$C_{20}$ alkyls are methyl, ethyl, n-propyl, n-butyl, iso-butyl, tert-butyl, n-pentyl, iso-pentyl, 1,1-dimethylpropyl, 1,2-dimethylpropyl, 3-methylbutyl, hexyl, heptyl, octyl or 1,1,3,3-tetramethylbutyl. Examples for $C_5$-$C_{12}$ cycloalkyl are cyclopentyl, cyclohexyl, cyclooctyl, cyclododecyl, adamantyl, 2-methylcyclohexyl, 3-methylcyclohexyl or 2,3-dimethylcyclohexyl. Such nucleating agents are disclosed in WO 03/102069 and by Blomenhofer et al. in Macromolecules 2005, 38, 3688-3695.

Examples of polymeric nucleating agents are polymeric nucleating agents containing vinyl compounds, which are for example disclosed in EP-A1-0152701 and EP-A2-0368577. The polymeric nucleating agents containing vinyl compounds can either be physically or chemically blended with the polypropylene. In physical blending the polymeric nucleating agent containing vinyl compounds is mixed with the polypropylene in an extruder or in a blender. In chemical blending the polypropylene comprising the polymeric nucleating agent containing vinyl compounds is produced in a polymerization process having at least two stages, in one of which the polymeric nucleating agent containing vinyl compounds is produced. Preferred vinyl compounds are vinyl cycloalkanes or vinyl cycloalkenes having at least 6 carbon atoms, such as for example vinyl cyclopentane, vinyl-3-methyl cyclopentane, vinyl cyclohexane, vinyl-2-methyl cyclohexane, vinyl-3-methyl cyclohexane, vinyl norbornane, vinyl cylcopentene, vinyl cyclohexene, vinyl-2-methyl cyclohexene. The most preferred vinyl compounds are vinyl cyclopentane, vinyl cyclohexane, vinyl cyclopentene and vinyl cyclohexene.

Further, it is possible to use blends of nucleating agents, such as for example a blend of talc and a phosphate ester salt or a blend of talc and a polymeric nucleating agent containing vinyl compounds.

While it is clear to the skilled person that the amount of nucleating agent to be added depends upon its crystallization efficiency, for the purposes of the present invention the nucleating agent or the blend of nucleating agents is present in the polypropylene in an amount of at least 50 ppm, preferably at least 100 ppm. It is present in an amount of at most 11000 ppm, preferably of at most 5000 ppm, more preferably of at most 4000 ppm, even more preferably of at most 3000 ppm and most preferably of at most 2000 ppm.

The propylene polymer of the present invention as defined above is produced by polymerizing propylene and at least one comonomer in presence of a Ziegler-Natta polymerization catalyst, an organoaluminum compound, an external electron donor (ED) and hydrogen.

A Ziegler-Natta polymerization catalyst comprises a titanium component, which has at least one titanium-halogen bond, and an internal donor, both supported on magnesium halide in active form.

The internal donor used in the present invention is a compound selected from the group consisting of phthalates, diethers, succinates, di-ketones, enamino-amines and any blend of these. Alternatively to a blend of internal donors in a single Ziegler-Natta polymerization catalyst, it is also possible to employ a respective blend of Ziegler-Natta polymerization catalysts, wherein each of the catalysts comprises a single internal donor. The preferred internal donor is a compound selected from the group consisting of phthalates, diethers, succinates and any blend of these. The most preferred internal donor is a compound selected from the group consisting of phthalates, diethers or blends of these.

Suitable phthalates are selected from the alkyl, cycloalkyl and aryl phthalates, such as for example diethyl phthalate, diisobutyl phthalate, di-n-butyl phthalate, dioctyl phthalate, diphenyl phthalate and benzylbutyl phthalate. Such catalysts are for example commercially available from Basell under the Avant trade name.

Suitable diethers are 1,3-diethers of formula $$R^1R^2C(CH_2OR^3)(CH_2OR^4)$$

wherein $R^1$ and $R^2$ are the same or different and are $C_1$-$C_{18}$ alkyl, $C_3$-$C_{18}$ cycloalkyl or $C_7$-$C_{18}$ aryl radicals; $R^3$ and $R^4$ are the same or different and are $C_1$-$C_4$ alkyl radicals; or are the 1,3-diethers in which the carbon atom in position 2 belongs to a cyclic or polycyclic structure made up of 5, 6 or 7 carbon atoms and containing two or three unsaturations. Ethers of this type are disclosed in published European patent applications EP-A-0 361 493 and EP-A-0 728 769. Representative examples of said diethers are 2-methyl-2-isopropyl-1,3-dimethoxypropane; 2,2-diisobutyl-1,3-dimethoxypropane; 2-isopropyl-2-cyclo-pentyl-1,3-dimethoxypropane; 2-isopropyl-2-isoamyl-1,3-dimethoxypropane; 9,9-bis(methoxymethyl)fluorene.

Suitable succinate compounds have the formula

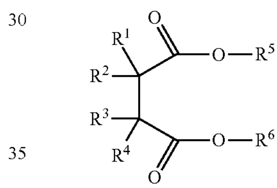

wherein $R^1$ to $R^4$ are equal to or different from one another and are hydrogen, or a $C_1$-$C_{20}$ linear or branched alkyl, alkenyl, cycloalkyl, aryl, arylalkyl or alkylaryl group, optionally containing heteroatoms, and $R^1$ to $R^4$, being joined to the same carbon atom, can be linked together to form a cycle; and $R^5$ and $R^6$ are equal to or different from one another and are a linear or branched alkyl, alkenyl, cycloalkyl, aryl, arylalkyl or alkylaryl group, optionally containing heteroatoms.

Suitable di-ketones are 1,3-di-ketones of formula

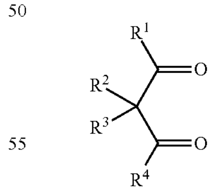

wherein $R^2$ and $R^3$ are equal to or different from one another and are hydrogen, or a $C_1$-$C_{20}$ linear or branched alkyl, alkenyl, cycloalkyl, aryl, arylalkyl or alkylaryl group, optionally containing heteroatoms, and $R^2$ and $R^3$, being joined to the same carbon atom, can be linked together to form a cycle; and $R^1$ and $R^4$ are equal to or different from one another and are a linear or branched alkyl, alkenyl, cycloalkyl, aryl, arylalkyl or alkylaryl group, optionally containing heteroatoms.

Suitable enamino-imines have the general formula

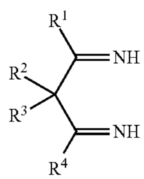

wherein $R^2$ and $R^3$ are equal to or different from one another and are hydrogen, or a $C_1$-$C_{20}$ linear or branched alkyl, alkenyl, cycloalkyl, aryl, arylalkyl or alkylaryl group, optionally containing heteroatoms, and $R^2$ and $R^3$, being joined to the same carbon atom, can be linked together to form a cycle; and $R^1$ and $R^4$ are equal to or different from one another and are a linear or branched alkyl, alkenyl, cycloalkyl, aryl, arylalkyl or alkylaryl group, optionally containing heteroatoms.

The organoaluminum compound is advantageously an alkyl-aluminium compound of the trialkyl-aluminium family, such as triethyl-aluminium, triisobutyl-aluminium, tri-n-butyl-aluminium, and linear or cyclic alkyl-aluminium compounds containing two or more Al atoms bonded to each other by way of O or N atoms, or $SO_4$ or $SO_3$ groups. Triethyl-aluminium is preferred. Advantageously, the trialkyl-aluminium has a hydride content, expressed as $AlH_3$, of less than to wt % with respect to the trialkyl-aluminium. More preferably, the hydride content is less than 0.5 wt %, and most preferably the hydride content is less than 0.1 wt %. The organoaluminum compound is used in such an amount as to have a molar ratio AIM in the range from 1 to 1000.

Suitable external electron donors (ED) include certain silanes, ethers, esters, amines, ketones, heterocyclic compounds and blends of these. It is preferred to use a 1,3-diether as defined above or a silane. It is most preferred to use a silane of the general formula

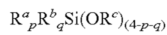

$$R^a_p R^b_q Si(OR^c)_{(4-p-q)}$$

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$ $Si(OCH_3)_2$, (cyclohexyl)(methyl) $Si(OCH_3)_2$ (referred to as "C donor"), (phenyl)$_2$ $Si(OCH_3)_2$ and (cyclopentyl)$_2$Si $(OCH_3)_2$ (referred to as "D donor"). (Cyclopentyl)$_2$ $Si(OCH_3)_2$ is the most preferred external donor.

The molar ratio of organo-aluminium compound to external donor ("Al/ED") ranges between 1 and 1000. Said Al/ED molar ratio preferably is at most 500, more preferably at most 200, even more preferably at most 100, and most preferably at most 50. Said Al/ED molar ratio preferably is at least 5. It is clear to the person skilled in the art that the molar ratio of organo-aluminium compound to external donor ("Al/ED") must be chosen such that the resulting propylene polymer has a xylene solubles content as defined above. This is well within the capabilities of the skilled person and need not be further described.

Hydrogen is used to control the chain lengths of the propylene polymer. For the production of a propylene polymer with higher MFI, i.e. with lower average molecular weight and shorter polymer chains, the concentration of hydrogen in the polymerization medium needs to be increased. Inversely, the hydrogen concentration in the polymerization medium has to be reduced in order to produce a propylene polymer with lower MFI, i.e. with higher average molecular weight and longer polymer chains.

Before being fed to the first polymerization reactor the Ziegler-Natta polymerization catalyst of the blend of Ziegler-Natta polymerization catalysts preferably undergoes a premix and/or a pre-polymerization step. In the premix step, the triethyl aluminium (TEAL) and the external electron donor (ED)—if present—, which have been pre-contacted, are mixed with the Ziegler-Natta catalyst at a temperature in the range from 0° C. to 30° C., preferably in the range from 5° C. to 20° C., for up to 15 min. The mixture of TEAL, external electron donor and Ziegler-Natta catalyst is pre-polymerized with propylene at a temperature in the range from 10° C. to 100° C., preferably in the range from 10° C. to 30° C., for 1 to 30 min, preferably for 2 to 20 min.

The polymerization of propylene and the one or more comonomers is carried out according to known techniques. The polymerization can for example be carried out in liquid propylene as reaction medium. It can also be carried out in a diluent, such as an inert hydrocarbon (slurry polymerization) or in the gas phase. For the present invention the propylene polymer is preferably produced by polymerization in liquid propylene at temperatures in the range from 20° C. to 100° C. Preferably, temperatures are in the range from 60° C. to 80° C. The pressure can be atmospheric or higher. Preferably the pressure is between 25 bar and 50 bar.

The propylene polymer of the present invention comprising at least two propylene polymer fractions of different melt flow indices can be produced (I) in a single polymerization reactor in presence of at least two Ziegler-Natta polymerization catalysts having different internal donors, each Ziegler-Natta polymerization catalyst having a different hydrogen response, or (II) in at least two sequential polymerization reactors in presence of a single Ziegler-Natta polymerization catalyst, wherein the hydrogen concentration in at least one of the polymerization reactors is different from the hydrogen concentration(s) in the remaining polymerization reactor(s).

Production method (II) is, however, preferred. The term "different hydrogen response" is used to denote that under essentially identical polymerization conditions, particularly under essentially the same hydrogen concentration, different polymerization catalysts result in propylene polymers having different melt flow indices.

In the case of a single polymerization reactor, the process for the production of the propylene polymer of the present invention in presence of (i) at least two Ziegler-Natta polymerization catalysts having different internal donors, each Ziegler-Natta polymerization catalyst having a different hydrogen response, each of said Ziegler-Natta catalysts comprising a titanium compound, which has at least one titanium-halogen bond, and an internal donor, both supported on magnesium halide in active form, (ii) an organoaluminum compound (Al), (iii) an external electron donor (ED), and (iv) hydrogen, comprises the step of polymerizing propylene and at least one comonomer in a single polymerization reactor, so as to produce the propylene polymer of the present invention as defined above.

In the preferred case of at least two sequential polymerization reactors, the process for the production of the propylene polymer of the present invention in presence of (i) a Ziegler-Natta polymerization catalyst, said Ziegler-Natta catalyst comprising a titanium compound, which has at least one titanium-halogen bond, and an internal donor, both supported on magnesium halide in active form,
(ii) an organoaluminum compound (Al),
(iii) an external electron donor (ED), and
(iv) hydrogen, comprises the steps of (a) polymerizing propylene or polymerizing propylene and at least one comonomer in a first polymerization reactor to produce a first propylene polymer fraction;
(b) transferring said first propylene polymer fraction to a second polymerization reactor; and
(c) polymerizing propylene or polymerizing propylene and at least one comonomer in said second polymerization reactor to produce a second propylene polymer fraction,
(f) recovering said propylene polymer after the last of the polymerization reactors.

wherein the hydrogen concentration in at least one of the sequential polymerization reactors is different from the hydrogen concentration in the remaining polymerization reactors, and wherein the hydrogen concentration in at least one of the polymerization reactors is controlled such as to produce therein the propylene polymer fraction with the lowest melt flow index as defined above, so as to produce the propylene polymer of the present invention as defined above. With respect to step (a) it is preferred that said first propylene polymer fraction is produced by polymerizing propylene and at least one comonomer. With respect to step (c) it is preferred that said second propylene polymer fraction is produced by polymerizing propylene and at least one comonomer.

While the number of polymerization reactors is not limited, it is nevertheless preferred for practical reasons to use two, three or four sequential polymerization reactors, more preferably two or three sequential polymerization reactors and most preferably two sequential polymerization reactors. If said process for the production of the propylene polymer of the present invention is performed in more than two sequential polymerization reactors, said process further comprises the steps of (d) transferring the combined propylene polymer fractions produced in the previous polymerization reactors to a further polymerization reactor; and
(e) polymerizing propylene or polymerizing propylene and at least one comonomer in said further polymerization reactor to produce a further propylene polymer fraction.

Depending upon the number of polymerization reactors steps (d) and (e) may be repeated. With respect to step (e) it is preferred that said further propylene polymer fraction is produced by polymerizing propylene and at least one comonomer.

In the case of at least two sequential polymerization reactors, the propylene polymer fraction with the lowest melt flow index within the above defined ranges, may be produced in any of the polymerization reactors. For example, in the case of two polymerization reactors the propylene polymer fraction with the lowest melt flow index may either be produced in the first or the second polymerization reactor. It is, however, preferred that the propylene polymer fraction with the lowest melt flow index is produced in the first polymerization reactor.

Under the provision that the total amount of the at least one comonomer of the propylene polymer and of the propylene polymer fractions of the present invention fails within the ranges as defined above, the at least one comonomer may be introduced into the at least two sequential polymerization reactors in such a way that the propylene polymer fractions produced in each of these polymerization reactors contain either the same or different contents of the at least one comonomer, as given in wt % relative to the total weight of the respective propylene polymer fraction. For the purposes of the present invention it is preferred that the at least one comonomer is introduced into the at least two sequential polymerization reactors in such a way that either all of the propylene polymer fractions of the propylene polymer have the same comonomer content, as given in wt % relative to the total weight of the respective propylene polymer fraction, or that the comonomer content of the propylene polymer fraction with the lowest melt flow index is such that it contains at least 80 wt % of the total comonomer content of the propylene polymer.

In the case that the at least one comonomer is introduced into the at least two sequential polymerization reactors in such a way that all of the propylene polymer fractions of the propylene polymer have substantially the same comonomer content, it is more preferred that the at least one comonomer is introduced in such a way that relative to the comonomer content of the propylene polymer fraction with the lowest melt flow index, the comonomer content of the other propylene polymer fractions is from 70% to 130%, even more preferably from 80% to 120%, still even more preferably from 90% to 110%, and most preferably from 95% to 105%, under the provision that the at least one comonomer is introduced into each of the at least two sequential polymerization reactors, i.e. that each of the propylene polymer fractions produced comprises comonomer.

In the case that the at least one comonomer is introduced into the at least two sequential polymerization reactors in such a way that the propylene polymer fraction with the lowest melt flow index contains at least 80 wt % of the total comonomer content of the propylene polymer, it is most preferred that the at least one comonomer is introduced in such a way that the propylene polymer fraction with the lowest melt flow index contains at least 80 wt % and at most 95 wt % of the total comonomer content of the propylene polymer.

In the case of two sequential polymerization reactors, the total comonomer content of the propylene polymer is either introduced into the first or the second or both polymerization reactors. If the total comonomer content of the propylene polymer is introduced into one reactor only, it is clear that the comonomer content of the propylene polymer fraction produced therein needs to be adapted accordingly, taking account of the contribution of the respective polymerization reactor to the total weight of the propylene polymer. It is, however, preferred that the comonomer is introduced in both reactors so as to produce the propylene polymer and the respective propylene polymer fractions defined earlier in this application.

The propylene polymer of the present invention is used in the production of thermoformed articles, particularly in the production of transparent thermoformed articles. Examples of such articles are food storage containers, drinking cups etc.

Thermoformed articles are generally produced by a two-stage process, wherein in the first stage a sheet is produced by melt-extruding a polymer, and in the second stage said sheet is shaped (thermoforming stage). The two stages may either directly follow each other (in-line thermoforming) or they may not directly follow each other, in which case the produced sheet is stored first and only later fed to the thermoforming stage.

The sheet may be produced on any melt extrusion sheet line, the production process for example comprising the steps of (I-a) feeding the propylene polymer of the present invention to an extruder,
(I-b) melting the propylene polymer in the extruder,
(I-c) optionally passing the molten propylene polymer through a melt pump,
(I-d) extruding the molten polymer through a slit die, and
(I-e) cooling the sheet.

The melt temperature of the propylene polymer generally is in the range from 200° C. to 280° C., preferably in the range from 210° C. to 270°. As the process for producing sheet is well known to the skilled person no further description is deemed necessary. Exemplary sheet production conditions are given in the examples.

The second stage, the thermoforming stage, can be done on any thermoforming machine comprising a heating and a forming section, said thermoforming process comprising the steps of (II-a) warming the sheet to a temperature at which it is soft,
(II-b) draping the soft sheet over or into a mold, thus obtaining a formed sheet,
(II-c) cooling the formed sheet to a temperature at which it can maintain its shape, and
(II-d) removing the formed sheet from the mold.

In the thermoforming stage the propylene polymer of the present invention can be processed under conditions that are comparable to the conditions used for a prior art propylene polymer.

The present inventors have noted with surprise that the use of the propylene polymer of the present invention allows to broaden the processing window in the thermoforming stage as compared to prior art polypropylene, such as a propylene homopolymer. Hence, the propylene polymer of the present invention allows for easier processing in the forming step. At the same time the propylene polymer of the present invention has mechanical properties that are comparable to those of a prior art propylene homopolymer In consequence, the present invention also discloses the use of the propylene polymer as defined above in thermoforming for broadening the thermoforming window by at least 0.5° C. as compared to a propylene homopolymer with a single propylene homopolymer fraction and a recovery compliance of $5.6 \cdot 10^{-4}$ $Pa^{-1}$ thermoformed under essentially the same conditions. Preferably, the thermoforming window is broadened by at least 0.6° C., more preferably by 0.8° C., even more preferably by at least 1.0° C. and most preferably by at least 1.2° C.

EXAMPLES

The following examples illustrate the advantages of the present invention and also give exemplary processing conditions for the sheet production and the forming stages. It is deemed well within the skills of the persons skilled in the art of thermoforming to adapt these processing conditions to his/her specific equipment.

Test Methods

The melt flow index (MFI) was measured according to ISO 1133, condition L, using a weight of 2.16 kg and a temperature of 230° C.

Flexural modulus was determined according to ISO 178:2001.

Notched izod impact strength was determined according to ISO 180/A:2000 at 23° C.

Top load of the thermoformed cups was determined in accordance with ISO12048:1994.

Haze was measured according to ISO 14782:1999 on injection molded plaques having a thickness of 1 mm.

The total ethylene content (wt % $C_2$) relative to the total weight of the propylene polymer is determined by NMR analysis of pellets according to the method described by G. J. Ray et al. in Macromolecules, vol. 10, no. 4, 1977, p. 773-778.

Xylene solubles (XS) were determined as follows: Between 4.5 and 5.5 g of propylene polymer were weighed into a flask and 300 ml xylene were added. The xylene was heated under stirring to reflux for 45 minutes. Stirring was continued for 15 minutes exactly without heating. The flask was then placed in a thermostated bath set to 25° C.+/−1° C. for 1 hour. The solution was filtered through Whatman n° 4 filter paper and exactly 100 ml of solvent were collected. The solvent was then evaporated and the residue dried and weighed. The percentage of xylene solubles ("XS") was then calculated according to XS (in wt %)=(Weight of the residue/Initial total weight of PP)*300

The recovery compliance is determined at 230° C. using a parallel-plate rotational stress rheometer. The sample is contained between two coaxial parallel discs in an oven filled with nitrogen. The test consists of monitoring the strain response when the stress has been deleted after a creep test. For the creep test a stress of 600 Pa is applied. Then the recovery compliance is the recoverable strain divided by the stress applied during the creep.

The thermoforming window is determined as follows: Sheet having a thickness of 1 mm is produced on a melt-extrusion line (see section on sheet extrusion below) and stored under ambient conditions for 7 days. The sheet is then thermoformed by plug-assisted pressure forming on a Gabler Swing thermoforming machine into cups having a depth of 50 mm and an inner diameter of 85 mm at the top and 65-67 mm at the bottom with a rim of 5 mm at the top using a four-fold mold, whereby only one of the molds is used for taking the samples for the determination of the thermoforming window. Initial oven settings for heating the sheet are chosen such that the sheet reaches a temperature at which it may just be thermoformed, and a total of 5 cups of the same mold are produced. The sheet temperature is then increased in increments of 1° C., whereby again a total of 5 cups of the same mold is produced at each temperature, until the sheet can no longer be thermoformed. The collected cups are then subjected to a dynamic compression test to determine the top load, the average of the top load of the 5 cups produced under identical conditions is taken and plotted against the respective sheet temperature. The plotted curve has a bell shape, i.e. the top load has a maximum. Said curve is then approximated by a $4^{th}$ degree polynomial equation of the general form $Y=a \cdot X^4+b \cdot X^3+c \cdot X^2+d \cdot X+e$, which in the following is used in the determination of the thermoforming window. The thermoforming window is defined as the range in sheet temperatures at which the top load is at least 80% of the maximum top load determined for the respective sheet.

Propylene Polymers

The propylene polymers of the example (Ex. 1) and the comparative examples (Comp. ex. 1 to 3) were produced in an industrial propylene polymerization plant having two sequential loop reactors. As catalyst a commercially available Ziegler-Natta polymerization catalyst with a phthalate as internal donor was used. As external donor, either (cyclohexyl)(methyl) $Si(OCH_3)_2$ (referred to as "C") or (cyclopentyl)$_2$ $Si(OCH_3)_2$ (referred to as "D") were used as indicated in table 1, wherein n.a. is to denote the cases where data is not available. Further polymerization conditions are given in table 1 as well, wherein the ethylene content is given as wt % relative to the total weight of the propylene polymer fraction produced in the respective loop. Properties of the so-obtained propylene polymers are given in table 2.

The so-obtained propylene polymers were additivated with antioxidants and a nucleating agent in an amount sufficient to avoid excessive degradation resp. to result in the desired level of transparency.

The melt flow index ($MFI_{final}$) of the propylene polymer produced in the second polymerization reactor is calculated using the following equation $$\mathrm{Log}(MFI_{final})=w_1\cdot\mathrm{Log}(MFI_1)+w_2\cdot\mathrm{Log}(MFI_2)$$

wherein $MFI_1$ and $MFI_2$ are the melt flow indices of the propylene polymer fractions produced in the first resp. the second polymerization reactor, and $w_1$ and $w_2$ are the respective weight fractions of the propylene polymer fractions produced in the first resp. the second polymerization reactor as expressed in wt % of the total propylene polymer produced in the two polymerization reactors together. These weight fractions are commonly also referred to as the contribution by the respective polymerization reactor.

More generally, the melt flow index ($MFI_{final}$) of the propylene polymer of the present invention can be calculated according to $$MFI_{final}=\sum_{i}^{i=n} w_i\cdot\mathrm{Log}(MFI_i)$$

wherein $w_i$ is the weight fraction of the respective propylene polymer fraction i as expressed in wt % of the total propylene polymer produced in all polymerization reactors, $MFI_i$ is the melt flow index of the respective propylene polymer fraction i, and n is the number of propylene polymer fractions.

Overall ethylene content of the propylene polymer, abbreviated as % $C2_{final}$, can be calculated according to $$\%\,C2_{final}=w_1\cdot\%\,C2_1+w_2\cdot\%\,C2_2$$

wherein % $C2_1$ and % $C2_2$ are the ethylene comonomer contents of the propylene polymer fractions produced in the first resp. the second polymerization reactor, and $w_1$ and $w_2$ are the respective weight fractions of the propylene polymer fractions produced in the first resp. the second polymerization reactor as expressed in wt % of the total propylene polymer produced in the two polymerization reactors together. These weight fractions are commonly also referred to as the contribution by the respective polymerization reactor. Using this equation, the ethylene content of the propylene polymer fraction produced in the second polymerization reactor can be calculated.

TABLE 1

| | Unit | Ex. 1 | Comp. ex. 1 | Comp. ex. 2 | Comp. ex. 3 |
|---|---|---|---|---|---|
| Catalyst | | Phthalate | Phthalate | Phthalate | Phthalate |
| External donor (ED) | | D | C | C | D |
| Catalyst activation | | | | | |
| TEAL/Propylene | g/kg | 0.20 | n.a. | 0.20 | 0.16 |
| TEAL/ED | g/g | 3.5 | n.a. | 20 | 4 |
| Loop 1 | | | | | |
| Temperature | ° C. | 70 | 71 | 72 | 70 |
| Hydrogen | vpm | 470 | n.a. | 210 | 460 |
| Contribution Loop 1 | % | 59 | 61 | 53 | 57 |
| Ethylene content | wt % | 0.4 | 0 | 0 | 0 |
| $MFI_1$ | dg/min | 0.6 | 3.0 | 0.7 | 0.7 |
| Loop 2 | | | | | |
| Temperature | ° C. | 65 | 66 | 68.5 | 65 |
| Hydrogen | vpm | 6020 | n.a. | 3300 | 5600 |
| Ethylene content (calc.) | wt % | 0.4 | 0 | 0 | 0 |
| $MFI_2$ (calc.) | dg/min | 42.5 | 3.0 | 18.3 | 29 |

TABLE 2

| | Unit | Ex. 1 | Comp. ex. 1 | Comp. ex. 2 | Comp. ex. 3 |
|---|---|---|---|---|---|
| MFI | dg/min | 3.5 | 3.0 | 3.3 | 3.5 |
| Xylene solubles | wt % | 2.3 | 4.0 | 3.3 | 1.7 |
| Recovery compliance | $10^{-4}$ $Pa^{-1}$ | 6.7 | 5.6 | 6.4 | 7.0 |
| Comonomer content | wt % | 0.4 | 0 | 0 | 0 |
| $T_{melt}$ | ° C. | 162 | 165 | 164 | 165 |
| Flexural modulus | MPa | 1960 | 1700 | 1890 | 2100 |
| Izod, notched, 23° C. | kJ/$m^2$ | 5.0 | 5.5 | 5.5 | 4.1 |
| Haze (1 mm) | % | 28 | 32 | 30 | 29 |

Sheet Extrusion

The propylene polymers of example 1 and comparative examples 1 to 3 were extruded into 1 mm thick sheet on a 1 m wide Reifenhäuser sheet extrusion line with an upward chill roll stack, a 70 mm extruder having a ratio of length to diameter (L/D) of 33), a melt pump and a coathanger die. Extrusion conditions are indicated in table 3.

TABLE 3

| | | |
|---|---|---|
| Extruder temperatures | Zone 1 | 230° C. |
| | Zones 2-10 | 240° C. |
| Die temperatures | | 240° C. |
| Chill roll temperatures | Bottom | 80° C. |
| | Middle | 105° C. |
| | Top | 105° C. |
| Die gap | | 1200 μm |
| Roll speed | | 3.5 m/min |

Thermoforming

The so-obtained sheet was thermoformed as described above for the determination of the thermoforming window. Thermoforming conditions are given in table 4. Following the previously described procedure the thermoforming window can be determined. Table 4 also indicates as "lowest sheet temperature for forming" the lowest temperature at which thermoformed cups were produced, i.e. the temperature at which the sheet may just be thermoformed. Results for the thermoforming window and the maximum top load are indicated in table 5.

TABLE 4

| | Unit | Ex. 1 | Comp. ex. 1 | Comp. ex. 2 | Comp. ex. 3 |
|---|---|---|---|---|---|
| Ambient temperature | ° C. | 17-18 | 17-18 | 17-18 | 17-18 |
| Cycle | $min^{-1}$ | 17.8 | 17.8 | 17.8 | 17.8 |
| Lowest sheet temp. for forming | ° C. | 145 | 147 | 148 | 151 |
| Plug delay time | s | 0.35 | 0.35 | 0.35 | 0.35 |
| Air | | | | | |
| Delay time | s | 0.6 | 0.6 | 0.6 | 0.6 |
| Pressure | bar | 4 | 4 | 4 | 4 |
| Forming time | s | 1.5 | 1.5 | 1.5 | 1.5 |

TABLE 5

| | Unit | Ex. 1 | Comp. ex. 1 | Comp. ex. 2 | Comp. ex. 3 |
|---|---|---|---|---|---|
| Max. top load | N | 290 | 240 | 270 | 280 |
| Width of thermo-forming window | ° C. | 5.0 | 3.5 | 4.2 | 3.7 |

The present inventors have been very surprised to see that the thermoformed cups made with the propylene polymer of the present invention retain the mechanical properties of a propylene homopolymer but at the same time have a significantly wider processing window.

Under industrial conditions the propylene polymer of example 1 has been shown to allow a shortening of the thermoforming cycle time by 8% to 25% in the production of drinking cups, relative to the cycle time with the propylene polymer of comparative examples 1 and 2 for the same thermoformed article.

The invention claimed is:

1. A process comprising:

thermoforming a propylene polymer wherein the propylene polymer comprises at least one comonomer and at least two propylene polymer fractions of different melt flow index, said propylene polymer being characterized by:

a melt flow index ranging from 0.5 dg/min to 8.0 dg/min, determined according to ISO 1133, condition L at 230° C. and 2.16 kg;

a xylene solubles content ranging from 1.0 wt % to 4.0 wt %, relative to a total weight of the propylene polymer;

a total comonomer content of from 0.1 wt % to 1.0 wt %, relative to the total weight of the propylene polymer;

wherein the propylene polymer fraction with the lowest melt flow index has a melt flow index ranging from 0.2 dg/min to 1.0 dg/min, determined according to ISO 1133, condition L at 230° C. and 2.16 kg, wherein each of the at least two propylene polymer fractions has substantially the same comonomer content and, relative to the comonomer content of the propylene polymer fraction with the lowest melt flow index, the comonomer content of the other propylene polymer fraction is from 70% to 130%, under the provision that each of the at least two propylene polymer fractions comprises comonomer;

and wherein the process is characterized in that a thermoforming window of the process is broadened by at least 0.5° C. as compared to thermoforming a propylene homopolymer with a single propylene homopolymer fraction and thermoformed under the same conditions.

2. The process of claim 1, wherein the thermoforming the propylene polymer comprises melt-extruding the propylene polymer to produce a sheet, and shaping the sheet.

3. The process of claim 2, wherein melt-extruding the propylene polymer to produce the sheet comprises:

feeding the propylene polymer to an extruder;

melting the propylene polymer in the extruder;

extruding the molten propylene polymer through a slit die to form the sheet; and cooling the sheet.

4. The process of claim 3, wherein the propylene polymer is melted at a temperature ranging from 200 to 280° C.

5. The process of claim 2, wherein shaping the sheet comprises:

warming the sheet;

draping the sheet over or into a mold to obtain a formed sheet;

cooling the formed sheet; and removing the formed sheet from the mold.

6. The process of claim 1, wherein the process is characterized in that the thermoforming window of the process is broadened by at least 0.6° C. as compared to thermoforming a propylene homopolymer with a single propylene homopolymer fraction.

7. The process of claim 1, wherein the melt flow index ranges from 1.0 dg/min to 5.0 dg/min, determined according to ISO 1133, condition L, at 230° C. and 2.16 kg.

8. The process of claim 1, wherein the total comonomer content ranges from 0.2 wt % to 0.8 wt %, relative to the total weight of the propylene polymer.

9. The process of claim 1, wherein the xylene solubles content ranges from 1.3 wt % to 3.5 wt %, relative to the total weight of the propylene polymer.

10. The process of claim 1, wherein the fraction with the lowest melt flow index has a melt flow index ranging from 0.3 dg/min to 0.9 dg/min, determined according to ISO 1133, condition L, at 230° C. and 2.16 kg.

11. The process of claim 1, wherein the propylene polymer comprises from 50 wt % to 70 wt %, relative to the total weight of the propylene polymer, of the propylene polymer fraction with the lowest melt flow index.

12. The process of claim 1, wherein each of the at least two propylene polymer fractions has the same comonomer content.

13. The process of claim 1, wherein at least 60 mol % of the total amount of comonomer is present as single comonomer units.

* * * * *